(12) United States Patent
Lee et al.

(10) Patent No.: US 10,531,540 B2
(45) Date of Patent: Jan. 7, 2020

(54) INTELLIGENT LAMP HOLDER AND USAGE METHOD APPLIED THEREIN

(71) Applicant: Cheng Uei Precision Industry Co., Ltd., New Taipei (TW)

(72) Inventors: James Cheng Lee, La Habra, CA (US); Kuo Yang Wu, New Taipei (TW); Wen Bing Hsu, New Taipei (TW); Hsin Chang Chen, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 16/286,664

(22) Filed: Feb. 27, 2019

(65) Prior Publication Data
US 2019/0297707 A1 Sep. 26, 2019

(30) Foreign Application Priority Data

Mar. 22, 2018 (TW) .............................. 107109819 A
Jan. 28, 2019 (TW) .............................. 108103171 A

(51) Int. Cl.
*H05B 37/02* (2006.01)
*G06F 9/30* (2018.01)
*H05B 33/08* (2006.01)

(52) U.S. Cl.
CPC ..... *H05B 37/0227* (2013.01); *G06F 9/30003* (2013.01); *H05B 33/0845* (2013.01); *H05B 37/0218* (2013.01); *H05B 37/0272* (2013.01)

(58) Field of Classification Search
CPC ............ H05B 37/0227; H05B 37/0272; H05B 37/0218; H05B 33/0845; G06F 9/30003
See application file for complete search history.

(56) References Cited

U.S. PATENT DOCUMENTS

| 8,729,834 | B1 * | 5/2014 | Funderburk | H05B 37/0245 315/312 |
| 2013/0049633 | A1 * | 2/2013 | Wann | H05B 33/0866 315/294 |
| 2014/0049972 | A1 * | 2/2014 | McGuire | F21V 21/00 362/427 |

(Continued)

*Primary Examiner* — Renan Luque
(74) *Attorney, Agent, or Firm* — Lin & Associates Intellectual Property, Inc.

(57) ABSTRACT

An intelligent lamp holder includes a microprocessor, a memory controlled by the microprocessor, an acoustic reception and transmission element, a sound recognition module, a light modulation module controlled by the microprocessor, a sensing module controlled by the microprocessor, an internet of things transmission protocol module controlled by the microprocessor, a wireless communication module connected with the internet of things transmission protocol module and the microprocessor, and an instruction match and situation application module for comparing operation instructions recognized by the internet of things transmission protocol module with a plurality of preset instructions. The acoustic reception and transmission element is connected with an external ultrasonic device for receiving ultrasonic signals, and converts the ultrasonic signals into digital signals. The sound recognition module is controlled by the microprocessor, and connected with the acoustic reception and transmission element. The digital signals are transmitted to the sound recognition module.

14 Claims, 7 Drawing Sheets

(56) References Cited

U.S. PATENT DOCUMENTS

| | | | |
|---|---|---|---|
| 2015/0282282 A1* | 10/2015 | Breuer | H05B 37/0272 |
| | | | 315/152 |
| 2015/0286948 A1* | 10/2015 | Luca | G05B 15/02 |
| | | | 706/48 |
| 2016/0105939 A1* | 4/2016 | Lee | H05B 33/0845 |
| | | | 315/201 |
| 2016/0255697 A1* | 9/2016 | Bhide | H02J 9/06 |
| | | | 315/161 |
| 2017/0265286 A1* | 9/2017 | Song | G06F 3/0482 |
| 2018/0092189 A1* | 3/2018 | Reier | H05B 37/0236 |
| 2018/0207393 A1* | 7/2018 | Baek | A61M 21/02 |
| 2019/0027958 A1* | 1/2019 | Kuo | H02J 9/06 |

* cited by examiner

INTELLIGENT LAMP HOLDER AND USAGE METHOD APPLIED THEREIN

CROSS-REFERENCE TO RELATED APPLICATION

The present application is based on, and claims priority from, Taiwan Patent Application No. 107109819, filed Mar. 22, 2018, and Taiwan Patent Application No. 108103171, filed Jan. 28, 2019, the disclosure of which is hereby incorporated by reference herein in its entirety.

BACKGROUND OF THE INVENTION

1. Field of the Invention

The present invention generally relates to a lamp holder, and more particularly to an intelligent lamp holder and a usage method applied therein.

2. The Related Art

Generally, functions of most of conventional lamp holders are single, and the most of the conventional lamp holders are just used for mounting lamps therein. With the rise of internet of things, a conventional intelligent lamp holder realizes controlling on-off statuses and a brightness modulation of the lamp by virtue of disposing an internet of things transmission protocol module and a wireless communication module inside the conventional intelligent lamp holder and is able to use an intelligent terminal which is a mobile phone or a tablet personal computer (TPC).

However, a user who uses the intelligent terminal to control the on-off statuses and the brightness modulation of the lamp need carry around the mobile phone, and furthermore, application softwares of the mobile phone need be opened to be able to use the mobile phone to control the on-off statuses and the brightness modulation of the lamp that causes an inconvenience to the user.

Thus it is essential to provide an innovative intelligent lamp holder having a better home feeling experience and used conveniently for satisfying requirements of the user.

SUMMARY OF THE INVENTION

An object of the present invention is to provide an intelligent lamp holder for mounting a lamp. The intelligent lamp holder and the lamp are controlled by an external ultrasonic device which transmits ultrasonic signals. The intelligent lamp holder includes a microprocessor, a memory, an acoustic reception and transmission element, a sound recognition module, a light modulation module, a sensing module, an internet of things transmission protocol module, a wireless communication module, and an instruction match and situation application module. The memory is connected with and controlled by the microprocessor for storing a plurality of preset instructions. The acoustic reception and transmission element is connected with the external ultrasonic device for receiving the ultrasonic signals, and the acoustic reception and transmission element converts the ultrasonic signals into digital signals. The acoustic reception and transmission element will proceed with a far field noise suppression processing on the received ultrasonic signals, the acoustic reception and transmission element collects the ultrasonic signals and proceeds with a noise reduction disposition on the ultrasonic signals. The sound recognition module is connected with and controlled by the microprocessor, and the sound recognition module is connected with the acoustic reception and transmission element. The digital signals are transmitted to the sound recognition module. The sound recognition module receives and recognizes the digital signals to generate execution instructions. The light modulation module is connected with and controlled by the microprocessor for controlling on-off statuses of the lamp and a brightness modulation of the lamp according to different execution instructions. The sensing module is connected with and controlled by the microprocessor for detecting and collecting environmental information, and transmitting the detected environmental information to the microprocessor for analyzing the detected environmental information, so that the on-off statuses of the lamp and the brightness modulation of the lamp are controlled according to different environmental information. The internet of things transmission protocol module is connected with and controlled by the microprocessor. The wireless communication module is connected with the internet of things transmission protocol module and the microprocessor. The intelligent lamp holder is connected with an intelligent terminal by virtue of the wireless communication module. The wireless communication module is used for receiving operation instructions sent from the intelligent terminal and the operation instructions are transmitted to the internet of things transmission protocol module to proceed with instruction recognition. The wireless communication module is used for sending status information of the on-off statuses and a brightness of the lamp to the intelligent terminal. The instruction match and situation application module is used for comparing the operation instructions recognized by the internet of things transmission protocol module with the plurality of the preset instructions in the memory, and the instruction match and situation application module chooses the corresponding operation instruction to execute.

Another object of the present invention is to provide an intelligent lamp holder for mounting and controlling a lamp. The intelligent lamp holder includes a microprocessor, a memory, an acoustic reception and transmission element, a sound recognition module, an instruction match and situation application module, a light modulation module, a sensing module, an internet of things transmission protocol module, and a wireless communication module. The memory is connected with and controlled by the microprocessor for storing a plurality of preset instructions. The acoustic reception and transmission element is for receiving sound signals inputted into the intelligent lamp holder, and the sound signals are converted into analog signals and then the analog signals continue being transmitted. The sound recognition module is connected with and controlled by the microprocessor, and the sound recognition module is connected with the acoustic reception and transmission element for receiving and recognizing the analog signals to generate execution instructions. The instruction match and situation application module is connected with and controlled by the microprocessor for comparing the execution instructions with the plurality of the preset instructions in the memory, and the instruction match and situation application module chooses at least one execution instruction to execute. The light modulation module is connected with and controlled by the microprocessor for controlling on-off statuses of the lamp and a brightness modulation of the lamp according to different execution instructions. The sensing module is connected with and controlled by the microprocessor for detecting and collecting environmental information, and transmitting the detected environmental information to the microprocessor to proceed with analyzing the detected environmental information, so that the on-off statuses of the lamp and the brightness modulation of the lamp are controlled according to different environmental information. The internet of things transmission protocol module is connected with and controlled by the microprocessor. The wireless communication module is connected with the internet of things transmission protocol module and the microprocessor. The intelligent lamp holder is connected with an intelligent terminal by virtue of the wireless communication module. The wireless communication module is used for receiving operation instructions sent from the intelligent terminal and the operation instructions are transmitted to the internet of things transmission protocol module to proceed with instruction recognition. The wireless communication module is used for sending own status information of the on-off statuses and a brightness of the lamp to the intelligent terminal. The instruction match and situation application module is used for comparing the operation instructions recognized by the internet of things transmission protocol module with the plurality of the preset instructions in the memory, and the instruction match and situation application module chooses the corresponding operation instruction to execute.

As described above, a purpose of controlling the on-off statuses of the lamp and the brightness modulation of the lamp is reached by virtue of a user using the voice instructions or the acoustic reception and transmission element receiving the ultrasonic signals, and the acoustic reception and transmission element converting the ultrasonic signals into the digital signals transmitted to the sound recognition module, and in addition, the intelligent lamp holder includes the sensing module, the on-off statuses of the lamp are confirmed according to a moving condition of the user, or a current position and condition of the user are confirmed by virtue of the sensing module detecting breathing conditions of the user, so that after the user is asleep or leaves the intelligent lamp holder, the lamp may be turned off automatically. As a result, the intelligent lamp holder has a better home feeling experience in use and is used conveniently for satisfying requirements of the user.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
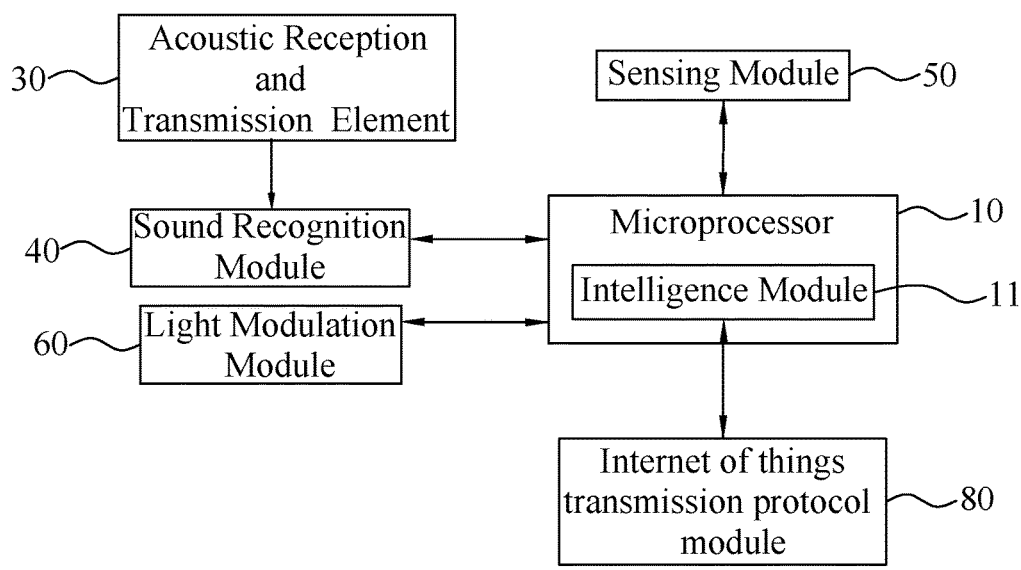
FIG. 1 is a block diagram of an intelligent lamp holder in accordance with a first preferred embodiment of the present invention.

With reference to FIG. 1 to FIG. 6, an intelligent lamp holder 100 in accordance with the present invention is shown. The intelligent lamp holder 100 is used for mounting and controlling a lamp 200. The intelligent lamp holder 100 includes a microprocessor 10, an acoustic reception and transmission element 30, a sound recognition module 40, a sensing module 50, a light modulation module 60, an instruction match and situation application module 70 and an internet of things transmission protocol module 80. The microprocessor 10 controls the sound recognition module 40, the sensing module 50, the light modulation module 60 and the internet of things transmission protocol module 80.

The intelligent lamp holder 100 further includes a memory 20 connected with and controlled by the microprocessor 10 for storing a plurality of preset instructions. The internet of things transmission protocol module 80 is connected with and controlled by the microprocessor 10. The wireless communication module 90 is connected with the internet of things transmission protocol module 80 and the microprocessor 10. The intelligent lamp holder 100 is connected with an intelligent terminal 300 by virtue of the wireless communication module 90, the wireless communication module 90 is used for receiving operation instructions sent from the intelligent terminal 300 and the operation instructions are transmitted to the internet of things transmission protocol module 80 to proceed with instruction recognition, the wireless communication module 90 is used for sending own status information of on-off statuses and a brightness of the lamp 200 to the intelligent terminal 300. The intelligent lamp holder 100 further includes an integrated module 101. The integrated module 101 includes the instruction match and situation application module 70, and the internet of things transmission protocol module 80.

Figure 2:
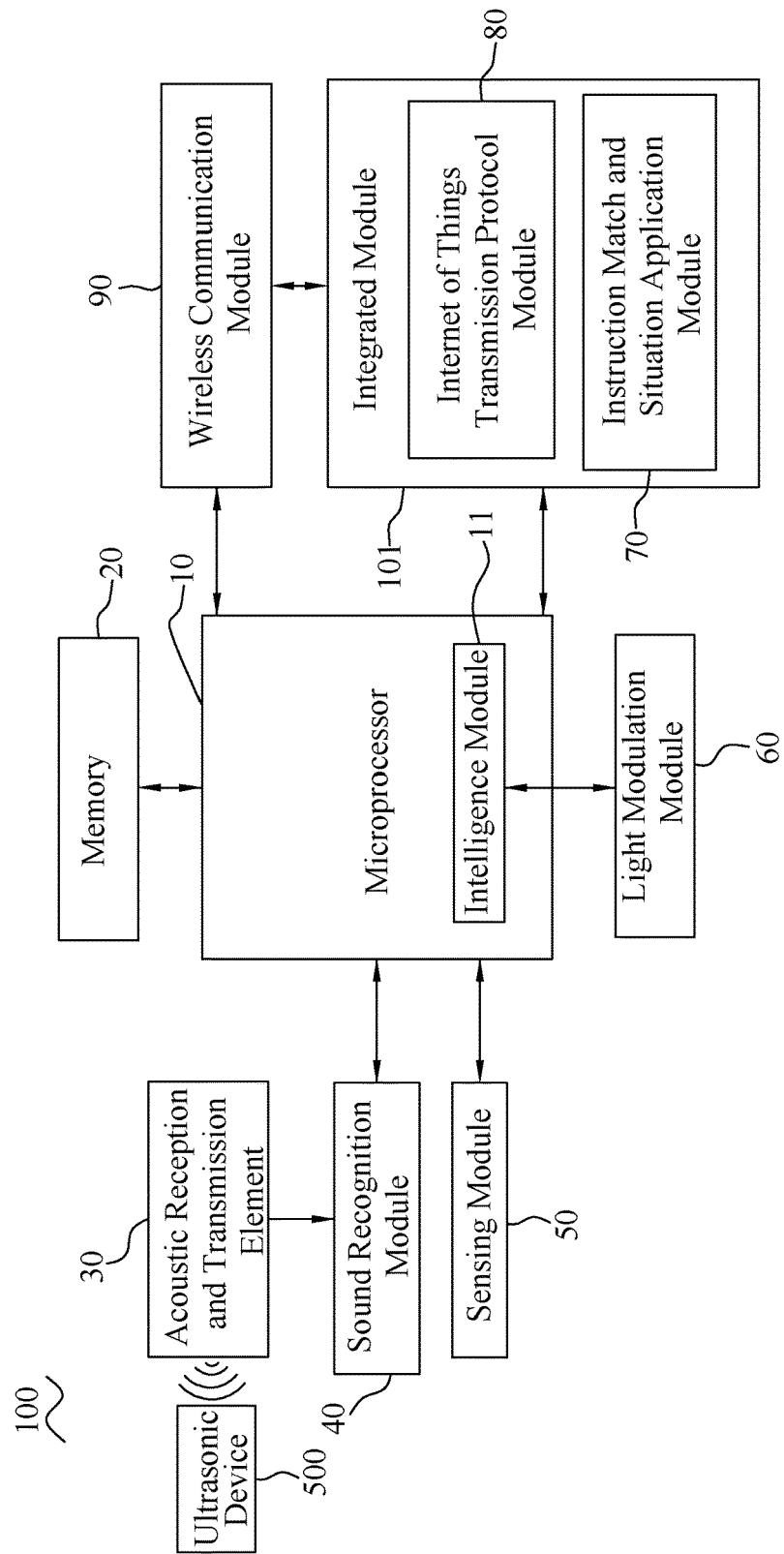
FIG. 2 is another block diagram of the intelligent lamp holder in accordance with the first preferred embodiment of the present invention.
Figure 3:
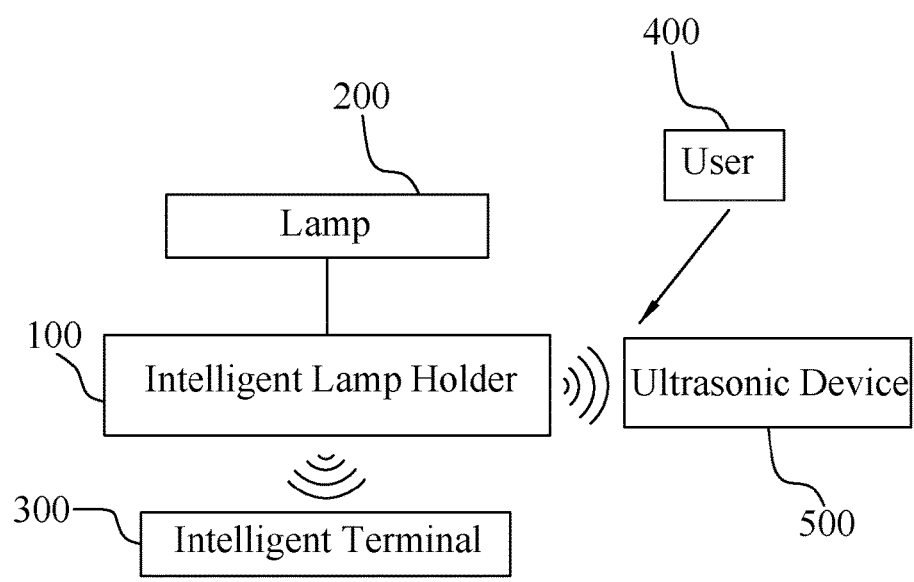
FIG. 3 is a block diagram showing that an intelligent terminal is connected with the intelligent lamp holder in accordance with the first preferred embodiment of the present invention.
Figure 4:
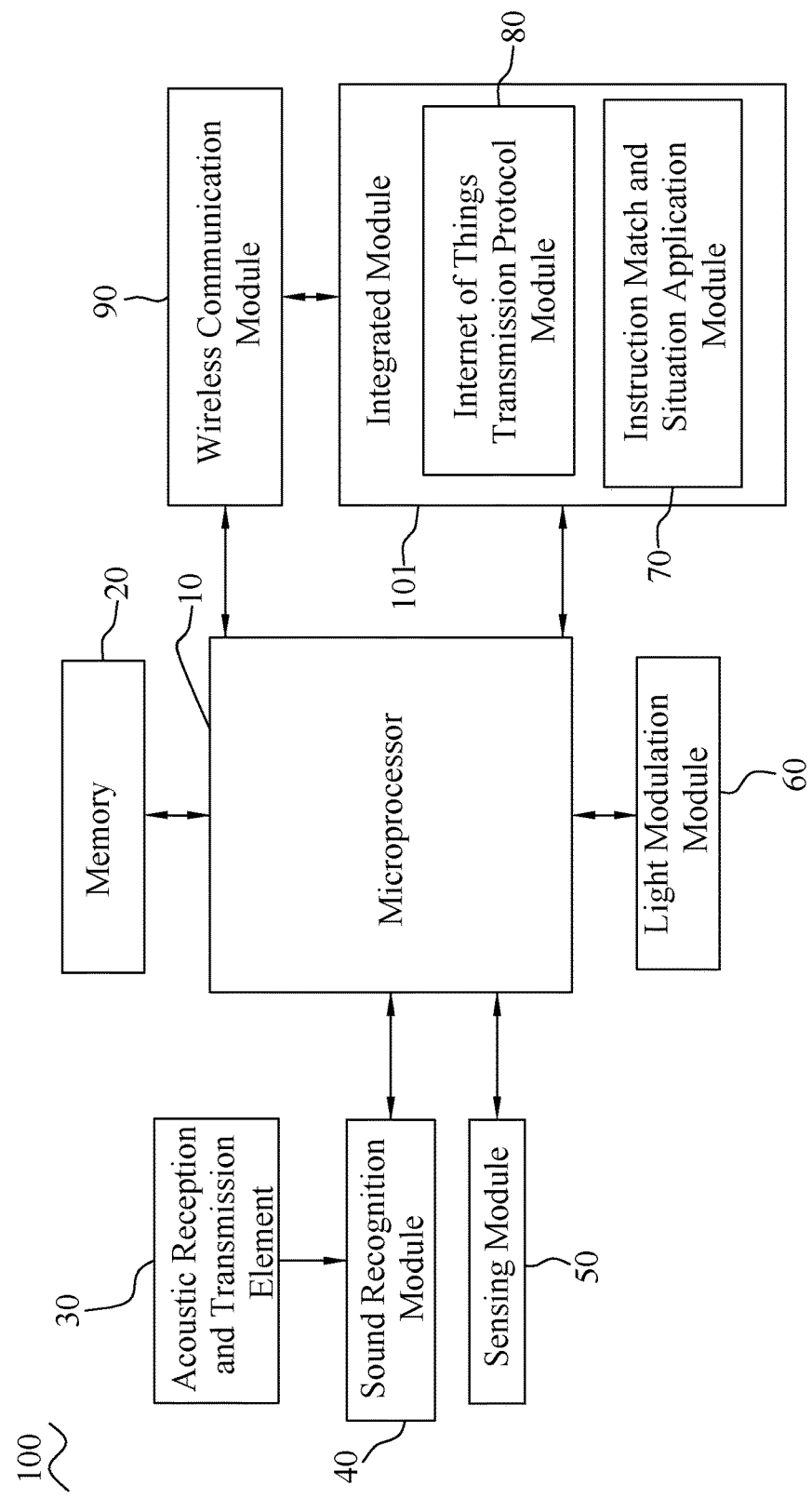
FIG. 4 is a block diagram of the intelligent lamp holder in accordance with a second preferred embodiment of the present invention.
Figure 5:
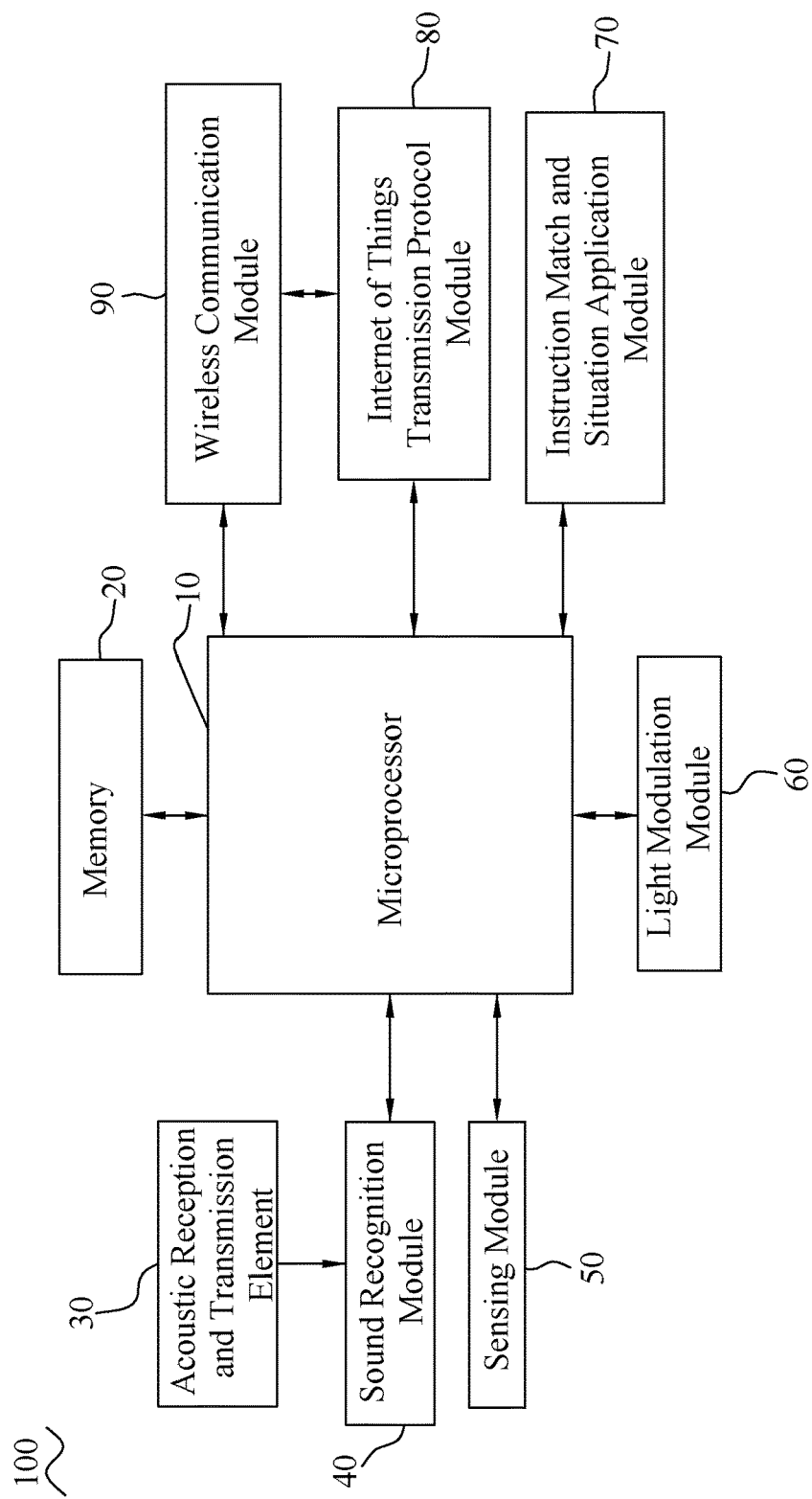
FIG. 5 is another block diagram of the intelligent lamp holder in accordance with the second preferred embodiment of the present invention.
Figure 6:
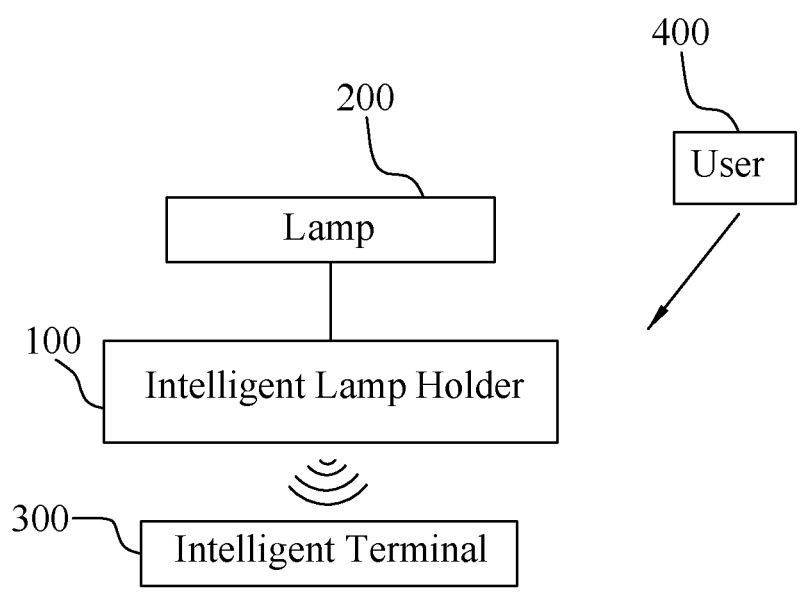
FIG. 6 is a block diagram showing that the intelligent terminal is connected with the intelligent lamp holder in accordance with the second preferred embodiment of the present invention.
Figure 7:
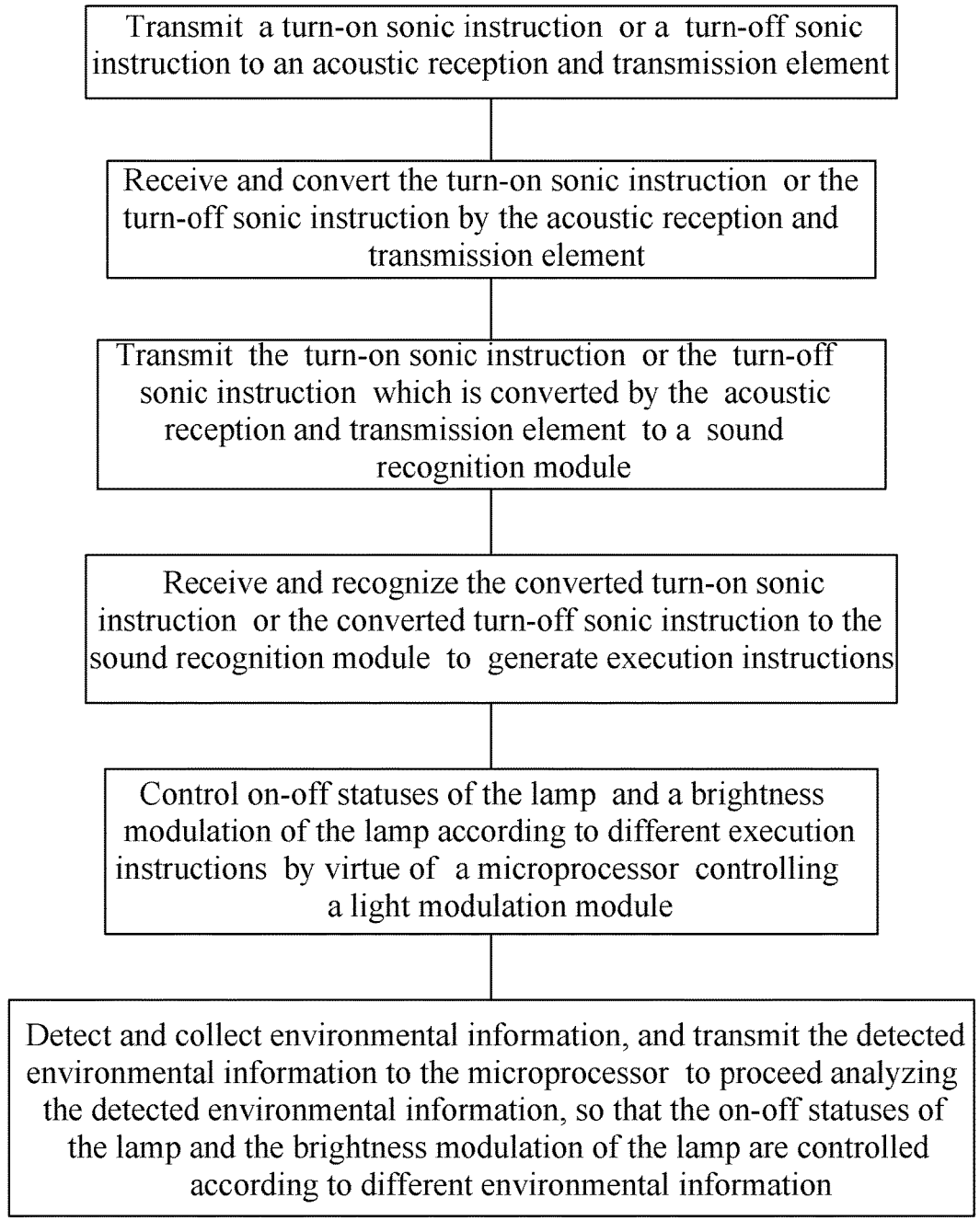
FIG. 7 is a flowchart of a usage method applied in the intelligent lamp holder in accordance with the present invention.

With reference to FIG. 1 to FIG. 3, the intelligent lamp holder 100 in accordance with a first preferred embodiment of the present invention is shown. The intelligent lamp holder 100 and the lamp 200 are controlled by an external ultrasonic device 500 which transmits ultrasonic signals. In the first preferred embodiment, the ultrasonic device 500 is a smart speaker. The intelligent lamp holder 100 for mounting the lamp 200, includes the microprocessor 10, the memory 20, the acoustic reception and transmission element 30, the sound recognition module 40, the sensing module 50, the light modulation module 60, the instruction match and situation application module 70, the internet of things transmission protocol module 80 and the wireless communication module 90. The sensing module 50 is a radar sensing module. The acoustic reception and transmission element 30 is at least one microphone or at least one microphone array.

The microprocessor 10 is used for receiving and processing instructions among the acoustic reception and transmission element 30, the sensing module 50, the light modulation module 60 and the internet of things transmission protocol module 80. The microprocessor 10 includes an intelligence module 11. The intelligence module 11 is disposed in the microprocessor 10. The intelligence module 11 has an artificial intelligence function and is connected with the internet of things transmission protocol module 80 for transmitting data to the internet of things transmission protocol module 80.

The acoustic reception and transmission element 30 is connected with the external ultrasonic device 500 and is used for receiving the ultrasonic signals. The acoustic reception and transmission element 30 converts the ultrasonic signals into digital signals. In the first preferred embodiment, the acoustic reception and transmission element 30 includes a plurality of the microphones. The external ultrasonic signals received by the acoustic reception and transmission element 30 are from the external ultrasonic device 500. The ultrasonic device 500 transmits the ultrasonic signals of execution instructions. After the acoustic reception and transmission element 30 receives and processes the ultrasonic signals, the received and processed ultrasonic signals are transmitted to the sound recognition module 40. A frequency range of the ultrasonic signals is between 15 KHz and 40 KHz. Preferably, the frequency range of the ultrasonic signals is between 20 KHz and 40 KHz. In addition, the acoustic reception and transmission element 30 will proceed with a far field noise suppression processing on the received ultrasonic signals. In the first preferred embodiment, the acoustic reception and transmission element 30 is an ultrasonic reception and transmission element.

The sound recognition module 40 is connected with and controlled by the microprocessor 10, and the sound recognition module 40 is connected with the acoustic reception and transmission element 30. The digital signals are transmitted to the sound recognition module 40. The sound recognition module 40 receives and recognizes the digital signals to generate the execution instructions. When the sound recognition module 40 confirms that the ultrasonic signals received and processed by the acoustic reception and transmission element 30 are transmitted from the ultrasonic device 500, the sound recognition module 40 transmits at least one execution instruction to the microprocessor 10.

The light modulation module 60 is connected with and controlled by the microprocessor 10 for controlling the on-off statuses of the lamp 200 and a brightness modulation of the lamp 200 according to different execution instructions. The light modulation module 60 turns on or turns off the lamp 200, and proceeds with the brightness modulation of the lamp 200 according to the different execution instructions transmitted by the microprocessor 10. In the first preferred embodiment, the light modulation module 60 is a reverse pulse width light modulator.

The sensing module 50 is connected with and controlled by the microprocessor 10 for detecting and collecting the environmental information, and transmitting the detected environmental information to the microprocessor 10 for analyzing the detected environmental information, so that the on-off statuses of the lamp 200 and the brightness modulation of the lamp 200 are controlled according to the different environmental information.

Specifically, the sensing module 50 is connected with and controlled by the microprocessor 10 for detecting breathing variations of a chest of a user 400 to confirm a current position of the user 400. The sensing module 50 transmits the breathing variations of the user 400 to the intelligence module 11 of the microprocessor 10 for analyzing the breathing variations of the user 400 according to breathing status information of the user 400, so that the on-off statuses of the lamp 200 and the brightness modulation of the lamp 200 are controlled according to different breathing conditions of the user 400. For example, when the user 400 is asleep, a breathing speed of the user 400 will become slower on account of the user 400 being asleep, the intelligent lamp holder 100 is capable of turning down the lamp 200 or turning off the lamp 200 according to asleep information of the user 400. When the sound recognition module 40 confirms that the ultrasonic signals received and processed by the acoustic reception and transmission element 30 are transmitted from the ultrasonic device 500, the microprocessor 10 starts the sensing module 50 to proceed with an environment detection, and detection data are transmitted to the microprocessor 10 regularly. The microprocessor 10 controls starting or turning off the light modulation module 60 according to the detection data in the microprocessor 10. In the first preferred embodiment, the sensing module 50 is a short range pulse radar. The instruction match and situation application module 70 is connected with and controlled by the microprocessor 10 for comparing the execution instructions with the plurality of the preset instructions in the memory 20, and the instruction match and situation application module 70 chooses at least one execution instruction to execute.

The internet of things transmission protocol module 80 is connected with the intelligence module 11 of the microprocessor 10, and the internet of things transmission protocol module 80 is controlled by the microprocessor 10. The intelligent lamp holder 100 is capable of connecting with other intelligent home appliances (not shown) by virtue of the internet of things transmission protocol module 80. In the first preferred embodiment, the internet of things transmission protocol module 80 uses a narrow band-internet of things (NB-IoT) technology. The wireless communication module 90 applies the narrow band-internet of things (NB-IoT) technology. The instruction match and situation application module 70 is used for comparing the operation instructions recognized by the internet of things transmission protocol module 80 with the plurality of the preset instructions in the memory 20, and the instruction match and situation application module 70 chooses the corresponding operation instruction to execute.

Referring to FIG. 1, FIG. 2, FIG. 3 and FIG. 7, specific steps of a usage method of the intelligent lamp holder 100 in accordance with the first preferred embodiment of the present invention are described as follows. When the user 400 comes back home, a wake-up instruction is assigned to the ultrasonic device 500. After the ultrasonic device 500 confirms a user identity, the ultrasonic device 500 transmits the ultrasonic signals carrying the execution instructions, the acoustic reception and transmission element 30 collects the ultrasonic signals and proceeds with a noise reduction disposition on the ultrasonic signals, and converts the ultrasonic signals into the digital signals. After the acoustic reception and transmission element 30 converts the ultrasonic signals into the digital signals, the digital signals are transmitted to the sound recognition module 40. After the sound recognition module 40 confirms that the ultrasonic signals received and processed by the acoustic reception and transmission element 30 are transmitted from the ultrasonic device 500, a result of confirming that the ultrasonic signals received and processed by the acoustic reception and transmission element 30 are transmitted from the ultrasonic device 500 is transmitted to the microprocessor 10. The microprocessor 10 transmits the execution instructions to the light modulation module 60. The microprocessor 10 controls the on-off statuses of the lamp 200 and the brightness modulation of the lamp 200. Simultaneously, the microprocessor 10 transmits a starting signal to start the sensing module 50 to proceed with the environment detection. The current position and condition of the user 400 are confirmed by virtue of the sensing module 50 detecting the breathing conditions of the user 400. When the breathing conditions of the user 400 are not detected and detecting time exceeds a defined time, namely the user 400 is shown to leave a detection range of the sensing module 50, the microprocessor 10 transmits a turn-off signal to the light modulation module 60 to turn off the lamp 200. A usage condition of the user 400 using the intelligent lamp holder 100 is capable of being further analyzed by virtue of the intelligence module 11 of the microprocessor 10, and the usage condition of the user 400 using the intelligent lamp holder 100 is transmitted to the internet of things transmission protocol module 80 to cooperate with other intelligent home appliances to work.

With reference to FIG. 4 to FIG. 7, the intelligent lamp holder 100 in accordance with a second preferred embodiment of the present invention, includes the microprocessor 10, the memory 20, the acoustic reception and transmission element 30, the sound recognition module 40, the sensing module 50, the light modulation module 60, the instruction match and situation application module 70, the internet of things transmission protocol module 80 and the wireless communication module 90. The sensing module 50 is an infrared sensor. The acoustic reception and transmission element 30 is the at least one microphone or the at least one microphone array. The intelligent lamp holder 100 in accordance with the second preferred embodiment further includes the integrated module 101. The integrated module 101 includes the instruction match and situation application module 70, and the internet of things transmission protocol module 80.

The memory 20 is connected with and controlled by the microprocessor 10 for storing a plurality of preset instructions. The acoustic reception and transmission element 30 is used for receiving sound signals inputted into the intelligent lamp holder 100 by the user 400, and the sound signals are converted into analog signals and then the analog signals continue being transmitted to the sound recognition module 40. In the second preferred embodiment, the acoustic reception and transmission element 30 of the intelligent lamp holder 100 further includes a plurality of microphones or a plurality of microphone arrays capable of proceeding with a noise reduction disposition on sound signals inputted by the user 400.

The sound recognition module 40 is connected with and controlled by the microprocessor 10, and the sound recognition module 40 is connected with the acoustic reception and transmission element 30 for receiving and recognizing the analog signals to generate the execution instructions. The instruction match and situation application module 70 is connected with and controlled by the microprocessor 10 for comparing the execution instructions with the plurality of the preset instructions in the memory 20, and the instruction match and situation application module 70 chooses the at least one execution instruction to execute. The light modulation module 60 is connected with and controlled by the microprocessor 10 for controlling the on-off statuses of the lamp 200 and the brightness modulation of the lamp 200 according to different execution instructions. The light modulation module 60 is a modulator which is based on pulse width modulation.

The sensing module 50 is connected with and controlled by the microprocessor 10 for detecting and collecting environmental information, and transmitting the detected environmental information to the microprocessor 10 for analyzing the detected environmental information, so that the on-off statuses of the lamp 200 and the brightness modulation of the lamp 200 are controlled according to different environmental information.

Specifically, the sensing module 50 is connected with and controlled by the microprocessor 10 for detecting activities of the user 400 and generating turn-on and turn-off commands. The instruction match and situation application module 70 still can be used for comparing the turn-on and turn-off commands generated by the sensing module 50 with the plurality of the preset instructions in the memory 20, and the instruction match and situation application module 70 chooses the turn-on command or the turn-off command to execute. In the second preferred embodiment, the sensing module 50 is a passive infrared sensor (PIR).

The internet of things transmission protocol module 80 is connected with and controlled by the microprocessor 10. The wireless communication module 90 is connected with the internet of things transmission protocol module 80 and the microprocessor 10. The intelligent lamp holder 100 is connected with an intelligent terminal 300 by virtue of the wireless communication module 90. The wireless communication module 90 is used for receiving operation instructions sent from the intelligent terminal 300 and the operation instructions are transmitted to the internet of things transmission protocol module 80 to proceed with instruction recognition. The instruction match and situation application module 70 is still used for comparing the operation instructions recognized by the internet of things transmission protocol module 80 with the plurality of the preset instructions in the memory 20, and the instruction match and situation application module 70 chooses the corresponding operation instruction to execute. The wireless communication module 90 is still used for sending status information of the on-off statuses and a brightness of the lamp 200 to the intelligent terminal 300 and the intelligent terminal 300 displaying the status information of the on-off statuses and the brightness of the lamp 200. The user 400 turns on or turns off the lamp 200 and proceeds with the brightness modulation of the lamp 200 according to a display information of the intelligent terminal 300. The intelligent terminal 300 is a smart phone, a tablet personal computer, or so on.

Referring to FIG. 4 to FIG. 7, specific steps of a usage method applied in the intelligent lamp holder 100 according to the second preferred embodiment of the present invention are described as follows. Steps of the usage method applied in the intelligent lamp holder 100 to control the lamp 200 are described as follows. At first, after the user 400 enters a room, the user 400 transmits a turn-on voice instruction or a turn-off voice instruction to the acoustic reception and transmission element 30 of the intelligent lamp holder 100, and the turn-on voice instruction or the turn-off voice instruction which is inputted and converted by the acoustic reception and transmission element 30 is transmitted to the sound recognition module 40 by the intelligent lamp holder 100. Then, recognize the turn-on voice instruction or the turn-off voice instruction by virtue of the sound recognition module 40. After the turn-on voice instruction or the turn-off voice instruction is recognized by the sound recognition module 40, turns on or turns off the lamp 200 according to the turn-on voice instruction or turn-off voice instruction. In addition, after the lamp 200 is turned on, the brightness of the lamp 200 is still able to be modulated by the user 400 and by virtue of a brightness voice instruction. For example, when the user 400 gives a first voice instruction, a second voice instruction or a third voice instruction, the sound recognition module 40 proceeds with the corresponding brightness modulation of the lamp 200 according to the first voice instruction, the second voice instruction or the third voice instruction given by the user 400. The voice instructions are not limited to the above-mentioned first voice instruction, the above-mentioned second voice instruction and the above-mentioned third voice instructions, and may be other preset recognizable voice instructions.

After the user 400 enters the room, the sensing module 50 transmits the turn-on command to the microprocessor 10 at the time of the sensing module 50 sensing the user 400, the microprocessor 10 turns on the lamp 200 according to the turn-on command. The method detects whether a human body of the user 400 moves or not by virtue of the sensing module 50. When a time interval between detecting each two movements of the user 400 does not exceed a preset time, the lamp 200 keeps a turn-on status. When the time interval between detecting each two movements of the user 400 exceeds the preset time, namely the user 400 has not moved (the user 400 is asleep) in the preset time, the sensing module 50 sends the turn-off command to the microprocessor 10 to turn off the lamp 200.

Referring to FIG. 1 to FIG. 7, so specific steps of the usage method applied in the intelligent lamp holder 100 according to the present invention are described as follows.

Transmitting a turn-on sonic instruction or a turn-off sonic instruction to the acoustic reception and transmission element 30.

Receiving and converting the turn-on sonic instruction or the turn-off sonic instruction by the acoustic reception and transmission element 30.

Transmitting the turn-on sonic instruction or the turn-off sonic instruction which is converted by the acoustic reception and transmission element 30 to the sound recognition module 40.

Receiving and recognizing the converted turn-on sonic instruction or the converted turn-off sonic instruction to the sound recognition module 40 to generate execution instructions.

Controlling the on-off statuses of the lamp 200 and the brightness modulation of the lamp 200 according to the different execution instructions by virtue of the microprocessor 10 controlling the light modulation module 60.

Detecting and collecting environmental information, and transmitting the detected environmental information to the microprocessor 10 for analyzing the detected environmental information, so that the on-off statuses of the lamp 200 and the brightness modulation of the lamp 200 are controlled according to the different environmental information.

Specific steps of another usage method applied in the intelligent lamp holder 100 according to the present invention are described as follows. The user 400 sends a turn-on request, a turn-off request and a brightness modulation request of controlling the on-off statuses of the lamp 200 and the brightness modulation of the lamp 200 to the intelligent lamp holder 100 by virtue of preset application programs of the intelligent terminal 300, so that a function of controlling the on-off statuses of the lamp 200 and the brightness modulation of the lamp 200 is reached.

As described above, a purpose of controlling the on-off statuses of the lamp 200 and the brightness modulation of the lamp 200 is reached by virtue of the user 400 using the voice instructions or the acoustic reception and transmission element 30 receiving the ultrasonic signals, and the acoustic reception and transmission element 30 converting the ultrasonic signals into the digital signals transmitted to the sound recognition module 40, and in addition, the intelligent lamp holder 100 includes the sensing module 50, the on-off statuses of the lamp 200 are confirmed according to a moving condition of the user 400, or the current position and condition of the user 400 are confirmed by virtue of the sensing module 50 detecting the breathing conditions of the user 400, so that after the user 400 is asleep or leaves the intelligent lamp holder 100, the lamp 200 may be turned off automatically. As a result, the intelligent lamp holder 100 has a better home feeling experience in use and is used conveniently for satisfying requirements of the user 400.

What is claimed is:

1. An intelligent lamp holder for mounting a lamp, the intelligent lamp holder and the lamp being controlled by an external ultrasonic device which transmits ultrasonic signals, the intelligent lamp holder comprising:
   a microprocessor;
   a memory connected with and controlled by the microprocessor for storing a plurality of preset instructions;
   an acoustic reception and transmission element connected with the external ultrasonic device for receiving the ultrasonic signals, and the acoustic reception and transmission element converting the ultrasonic signals into digital signals, the acoustic reception and transmission element proceeding with a far field noise suppression processing on the received ultrasonic signals, the acoustic reception and transmission element collecting the ultrasonic signals and proceeding with a noise reduction disposition on the ultrasonic signals;
   a sound recognition module connected with and controlled by the microprocessor, and the sound recognition module being connected with the acoustic reception and transmission element, the digital signals being transmitted to the sound recognition module, the sound recognition module receiving and recognizing the digital signals to generate execution instructions;
   a light modulation module connected with and controlled by the microprocessor for controlling on-off statuses of the lamp and a brightness modulation of the lamp according to different execution instructions;
   a sensing module connected with and controlled by the microprocessor for detecting and collecting environmental information, and transmitting the detected environmental information to the microprocessor for analyzing the detected environmental information, so that the on-off statuses of the lamp and the brightness modulation of the lamp are controlled according to different environmental information;
   an internet of things transmission protocol module connected with and controlled by the microprocessor;
   a wireless communication module connected with the internet of things transmission protocol module and the microprocessor, the intelligent lamp holder being connected with an intelligent terminal by virtue of the wireless communication module, the wireless communication module being used for receiving operation instructions sent from the intelligent terminal and the operation instructions being transmitted to the internet of things transmission protocol module to proceed with instruction recognition, the wireless communication module being used for sending status information of the on-off statuses and a brightness of the lamp to the intelligent terminal; and
   an instruction match and situation application module being used for comparing the operation instructions recognized by the internet of things transmission protocol module with the plurality of the preset instructions in the memory, and the instruction match and situation application module choosing the corresponding operation instruction to execute.

2. The intelligent lamp holder as claimed in claim 1, wherein the sensing module is a radar sensing module, and the sensing module is a short range pulse radar.

3. The intelligent lamp holder as claimed in claim 1, wherein the light modulation module is a reverse pulse width light modulator.

4. The intelligent lamp holder as claimed in claim 1, further comprising an intelligence module disposed in the microprocessor, the intelligence module having an artificial intelligence function and being connected with an internet of things transmission protocol module for transmitting data to the internet of things transmission protocol module.

5. The intelligent lamp holder as claimed in claim 4, wherein the internet of things transmission protocol module uses a narrow band-internet of things technology.

6. The intelligent lamp holder as claimed in claim 4, wherein the sensing module is connected with the microprocessor for detecting breathing variations of a chest of a user to confirm a current position of the user, the sensing module transmits the breathing variations of the user to the intelligence module of the microprocessor for analyzing the breathing variations of the user according to breathing status information of the user, so that the on-off statuses of the lamp and the brightness modulation of the lamp are controlled according to different breathing conditions of the user.

7. The intelligent lamp holder as claimed in claim 1, wherein a frequency range of the ultrasonic signals is between 15 KHz and 40 KHz.

8. The intelligent lamp holder as claimed in claim 1, wherein the acoustic reception and transmission element is an ultrasonic reception and transmission element.

9. An intelligent lamp holder for mounting and controlling a lamp, comprising:
   a microprocessor;
   a memory connected with and controlled by the microprocessor for storing a plurality of preset instructions;
   an acoustic reception and transmission element for receiving sound signals inputted into the intelligent lamp holder, and the sound signals being converted into analog signals and then the analog signals continuing being transmitted;
   a sound recognition module connected with and controlled by the microprocessor, and the sound recognition module being connected with the acoustic reception and transmission element for receiving and recognizing the analog signals to generate execution instructions;
   an instruction match and situation application module connected with and controlled by the microprocessor for comparing the execution instructions with the plurality of the preset instructions in the memory, and the instruction match and situation application module choosing at least one execution instruction to execute;
   a light modulation module connected with and controlled by the microprocessor for controlling on-off statuses of the lamp and a brightness modulation of the lamp according to different execution instructions;
   a sensing module connected with and controlled by the microprocessor for detecting and collecting environmental information, and transmitting the detected environmental information to the microprocessor for analyzing the detected environmental information, so that the on-off statuses of the lamp and the brightness modulation of the lamp are controlled according to different environmental information;
   an internet of things transmission protocol module connected with and controlled by the microprocessor; and
   a wireless communication module connected with the internet of things transmission protocol module and the microprocessor, the intelligent lamp holder being connected with an intelligent terminal by virtue of the wireless communication module, the wireless communication module being used for receiving operation instructions sent from the intelligent terminal and the operation instructions being transmitted to the internet of things transmission protocol module to process instruction recognition, the wireless communication module being used for sending own status information of the on-off statuses and a brightness of the lamp to the intelligent terminal;
   wherein the instruction match and situation application module is used for comparing the operation instructions recognized by the internet of things transmission protocol module with the plurality of the preset instructions in the memory, and the instruction match and situation application module chooses the corresponding operation instruction to execute.

10. The intelligent lamp holder as claimed in claim 9, wherein the light modulation module is a modulator which is based on pulse width modulation.

11. The intelligent lamp holder as claimed in claim 9, wherein the sensing module is a passive infrared sensor, the sensing module is connected with and controlled by the microprocessor for detecting activities of a user and generating turn-on and turn-off commands, the instruction match and situation application module is used for comparing the turn-on and turn-off commands generated by the sensing module with the plurality of the preset instructions in the memory, and the instruction match and situation application module chooses the turn-on command or the turn-off command to execute.

12. The intelligent lamp holder as claimed in claim 9, wherein the instruction match and situation application module and the internet of things transmission protocol module are comprised in an integrated module.

13. The intelligent lamp holder as claimed in claim 9, wherein the acoustic reception and transmission element is at least one microphone array.

14. The intelligent lamp holder as claimed in claim 9, wherein the acoustic reception and transmission element is at least one microphone.

* * * * *